United States Patent
Varela et al.

(10) Patent No.: US 7,047,838 B2
(45) Date of Patent: May 23, 2006

(54) TRANSFER CASE ASSEMBLY HAVING MULTIPLE GEAR MOUNTING LOCATIONS

(75) Inventors: Tomaz Dopico Varela, Gahanna, OH (US); Silvio Masaaki Yamada, Gahanna, OH (US); Hong-Tao Lee, Granville, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 354 days.

(21) Appl. No.: 10/138,156

(22) Filed: May 2, 2002

(65) Prior Publication Data

US 2003/0205104 A1    Nov. 6, 2003

(51) Int. Cl.
*F16H 57/02*    (2006.01)

(52) U.S. Cl. ............................ 74/606 R; 74/413 R

(58) Field of Classification Search .......... 79/395, 79/397, 412 R, 413, 421 R, 606 R
See application file for complete search history.

(56) References Cited

U.S. PATENT DOCUMENTS

| | | | | | |
|---|---|---|---|---|---|
| 2,228,581 A | * | 1/1941 | Olen | .................. | 475/225 |
| 2,704,464 A | * | 3/1955 | Lautenbach et al. | .......... | 74/325 |
| 3,783,710 A | * | 1/1974 | Steinhagen | ............ | 74/665 GA |
| 4,108,021 A | * | 8/1978 | MacAfee et al. | ......... | 74/606 R |
| 4,319,499 A | * | 3/1982 | Sanui et al. | ................. | 475/200 |
| 4,433,589 A | * | 2/1984 | Chaconas | .................... | 74/325 |
| 4,468,979 A | * | 9/1984 | Inagaki et al. | ............ | 74/606 R |
| 2001/0010177 A1 | | 8/2001 | Bologna | | |

FOREIGN PATENT DOCUMENTS

| | | | |
|---|---|---|---|
| EP | 0 926 399 A | | 6/1999 |
| EP | 1 113 192 A | | 7/2001 |
| GB | 634 969 A | | 3/1950 |
| GB | 2 220 247 A | * | 4/1990 |

* cited by examiner

*Primary Examiner*—Vicky A. Johnson
(74) *Attorney, Agent, or Firm*—Carlson, Gaskey & Olds

(57) ABSTRACT

A transfer case assembly includes an input gear, an idler gear, and an output gear. The idler gear is mounted on an idler shaft, which is rotatably supported by a bearing retained within a carrier. The carrier fits within an arcuate slot. The arcuate slot defines a multiple of idler shaft predetermined mounting locations. Each of the idler shaft predetermined mounting locations are equidistant from the third axis, and vary in distance from the first axis. For each of the idler shaft predetermined mounting locations a gear, of a predetermined size is provided to achieve a proper gear mesh for the desired gear ratio.

23 Claims, 4 Drawing Sheets

TRANSFER CASE ASSEMBLY HAVING MULTIPLE GEAR MOUNTING LOCATIONS

BACKGROUND OF THE INVENTION

The present invention relates to a gear assembly, and more particularly to a transfer case which provides multiple gear mounting locations to achieve multiple gear ratios within a common housing.

Transfer cases are known for transferring torque from an engine to front and rear vehicle wheels through a gear arrangement having an input shaft, an idler shaft, and an output shaft. Gears mounted upon each shaft mesh to form a specific gear ratio.

A common transfer case housing may be provided for multiple vehicle platforms. However, each platform may require a different gear ratio. Within a transfer case housing openings for gear shafts are in fixed locations. If the size of one gear changes then all gears must be changed, as the shafts are in fixed locations. Thus, when a particular gear ratio is required, such as for a particular vehicle platform, all the gears are typically different designs to provide proper gear meshing. With a three gear system each new gear ratio will require three new parts using a conventional design approach. In some instances providing a particular gear ratio may require a different transfer case housing to accommodate the desired gear sizes.

Accordingly, it is desirable to provide a transfer case which minimizes the proliferation of parts while having the flexibility to contain different gear ratios within a common housing.

SUMMARY OF THE INVENTION

A transfer case assembly includes an input gear, an idler gear, and an output gear. The input gear is rotatably supported by an input shaft which rotates about a first axis. The input gear meshes with idler gear causing the idler gear to rotate. The idler gear is supported by an idler shaft which rotates about a second axis, parallel and offset from the first axis. The idler gear meshes with the output gear. The output gear is mounted on an output shaft which rotates about a third axis, parallel and offset from the second axis.

The idler shaft is rotatably supported by a bearing retained within a carrier which is moveable within an arcuate slot. The arcuate slot is inset within a wall of the transfer case housing. Within the arcuate slot there are a multiple of idler shaft predetermined mounting locations for the carrier.

Each of the idler shaft predetermined mounting locations corresponds to a predefined location for the second axis. The idler shaft predetermined mounting locations are equidistant from the third axis, and vary in distance from the first axis. For each of the idler shaft predetermined mounting locations an input gear of a particular predetermined size is required. Each predetermined mounting location thereby provides a different gear ratio.

The present invention therefore provides a transfer case having multiple gear mounting locations to achieve multiple desired gear ratios within a common housing while minimizing part proliferation.

BRIEF DESCRIPTION OF THE DRAWINGS

The present invention will now be described, by way of example only, with reference to the accompanying drawings in which.

DETAILED DESCRIPTION OF THE INVENTION

Figure 1:
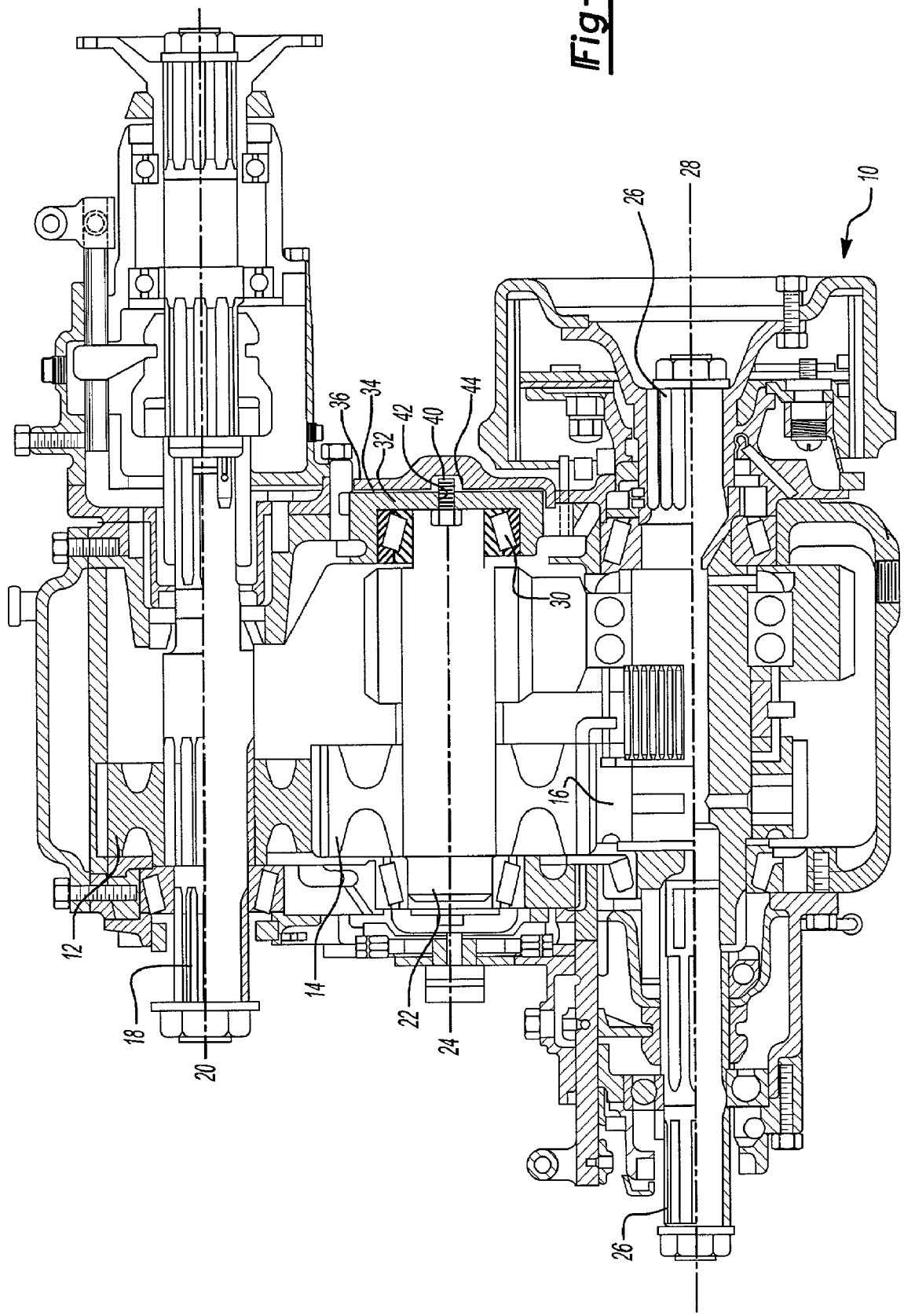
FIG. 1 is a sectional view of a transfer case assembly.

A transfer case assembly 10 is shown in FIG. 1. It should be understood that other gear systems will benefit from the present invention. The transfer case assembly 10 includes an input gear 12, an idler gear 14, and an output gear 16. An input shaft 18 supports the input gear 12. The input shaft 18 rotates about a first axis 20. Rotation of the input shaft 18 causes the input gear 12 to rotate therewith. The input gear 12 meshes with idler gear 14 causing the idler gear 14 to rotate. An idler shaft 22 supports the idler gear 14. The idler shaft 22 rotates about a second axis 24. The second axis 24 is parallel and offset from the first axis 20. The idler gear 12 meshes with the output gear 16. The output gear 16 is mounted on an output shaft 26, which rotates about a third axis 28, parallel and offset from the second axis 24. The output shaft 26 carries the torque out of the transfer case assembly 10 and through other driveline structure to drive at least one wheel of a vehicle.

Figure 2:
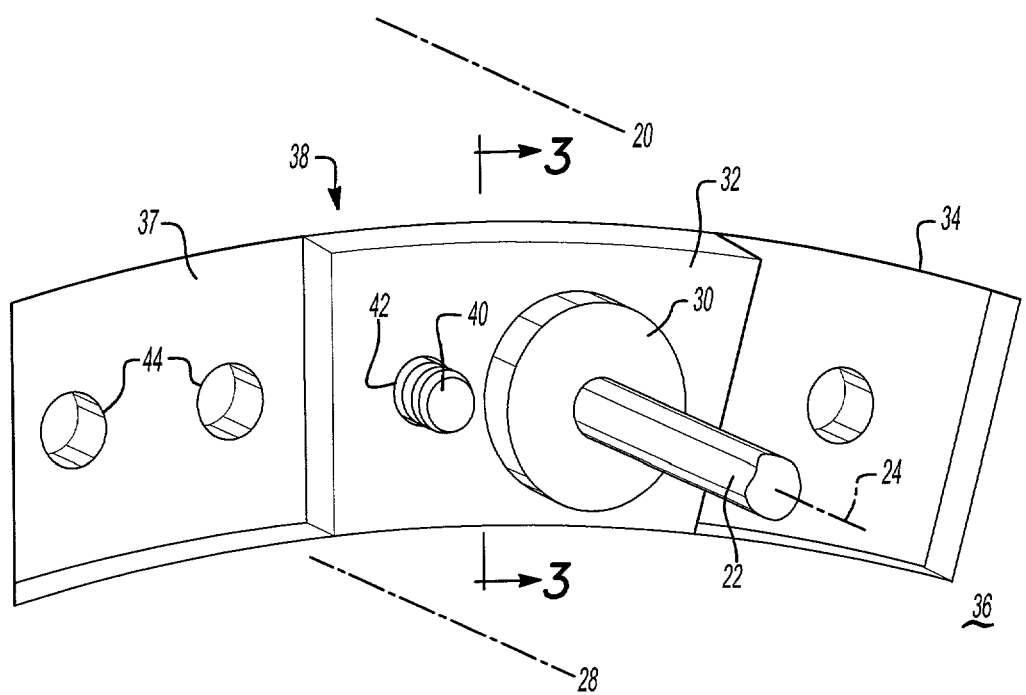
FIG. 2 is an enlarged perspective view of the idler shaft mounting arrangement.
Figure 3:
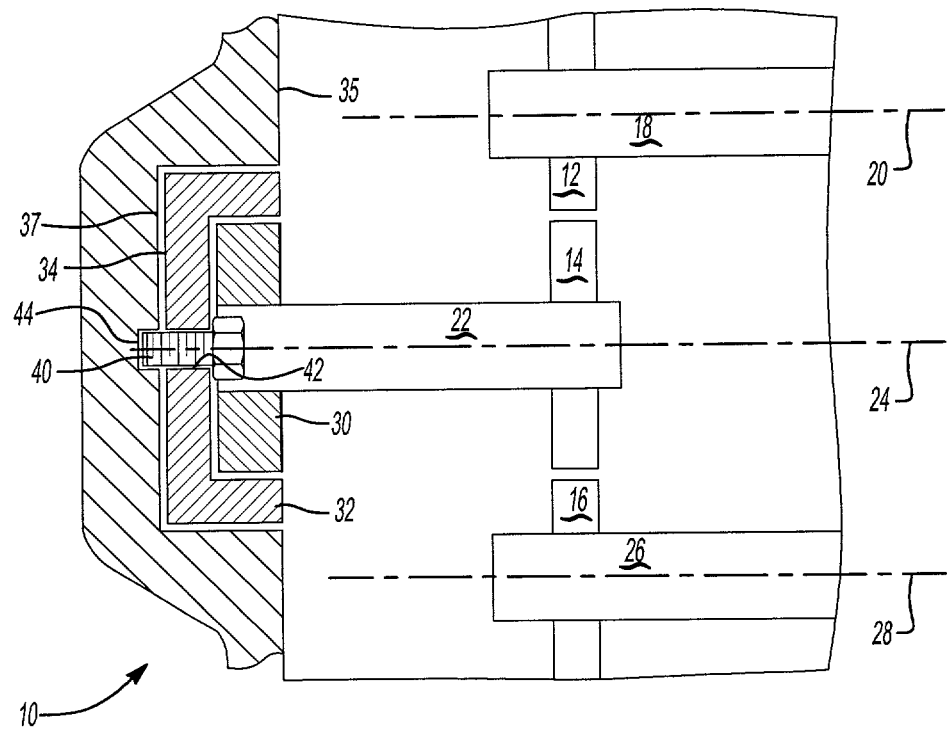
FIG. 3 is an expanded sectional view of idler shaft mounting arrangement taken along the line 3—3 of FIG. 2.

Referring to FIG. 2 a bearing 30 rotatably supports the idler shaft 22. The bearing 30 is retained within a carrier 32. The carrier 32 is fixably received within an arcuate slot 34 which is inset within an inner wall 35 (FIG. 3) of a transfer case housing 36. The rear wall 37 of the arcuate slot 34 is preferably offset from the inner wall 35 of the transfer case housing 36 such that the carrier 32 is essentially flush with the inner wall 35 when mounted.

The arcuate slot 34 defines a multiple of idler shaft predetermined mounting locations 38. The carrier 32 is mountable at each of the idler shaft predetermined mounting locations. A fastener 40, such as a pin, extends through an opening 42 in the carrier 32 and an opening 44 in the inner wall 35 of the transfer case housing 36 to retain the carrier 32. It should be understood that other fasteners such as bolts, welding, and the like could be utilized with the present invention.

Each of the idler shaft predetermined mounting locations 38 corresponds to a new location for the second axis 24. Openings 44 may be spaced such that they occur at a predefined distance from each other, or may be spaced according to specific predefined gear sizes. Openings 44 preferably correspond to the predetermined mounting location 38. The gear sizes are determined by the desired gear ratios to correspond with the predetermined mounting locations 38.

The arcuate slot 34 is preferably centered about the third axis 28. Each of the idler shaft predetermined mounting locations 38 is equidistant from the third axis 28, but vary in distance from the first axis 20. That is, at each predetermined mounting location, the third axis 28 is equidistant from the second axis 24, but the distance between the second axis 24 and the first axis 20 will vary based on the position of the arcuate slot 34.

The size of each input gear 12 corresponds to the varying distance from the second axis 24 to the first axis 20. For each of the idler shaft predetermined mounting locations 38 an input gear 12 of a particular predetermined size is required to achieve a proper gear mesh. Each particular input gear 12 provides different gear ratio in combination with the other gears.

Figures 4A, 4B:
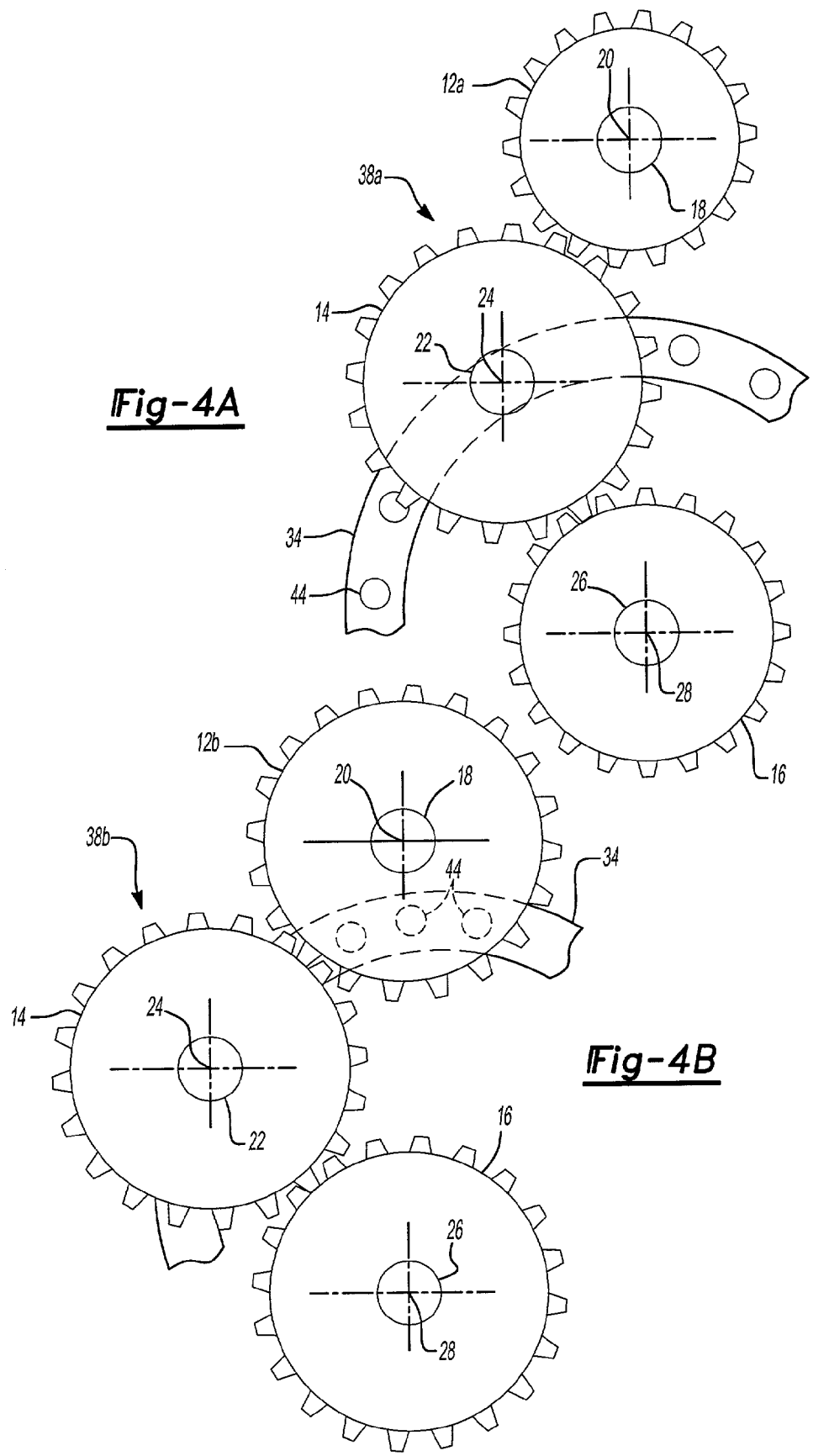
FIG. 4a is a schematic view of a gear arrangement of the present invention in a first position.
FIG. 4b is a schematic view of a gear arrangement of the present invention in a second position.

Referring to FIG. 4A, the second axis 24 has been fixed at one of the idler shaft predetermined mounting locations 38a. The idler shaft predetermined mounting location 38a corresponds to the size of the input gear 12a to provide a desired gear ratio. FIG. 4b shows the second axis 24 fixed at another of the idler shaft predetermined mounting locations 38b. The input gear 12b shown corresponds to the second idler shaft predetermined mounting location 38b to provide a second gear ratio. The output gear 16 and the idler gear 14 have not changed. The gear configuration shown in FIG. 4a provides a different gear ratio from the gear configuration shown in FIG. 4b with the change of only a single gear.

Figure 5:
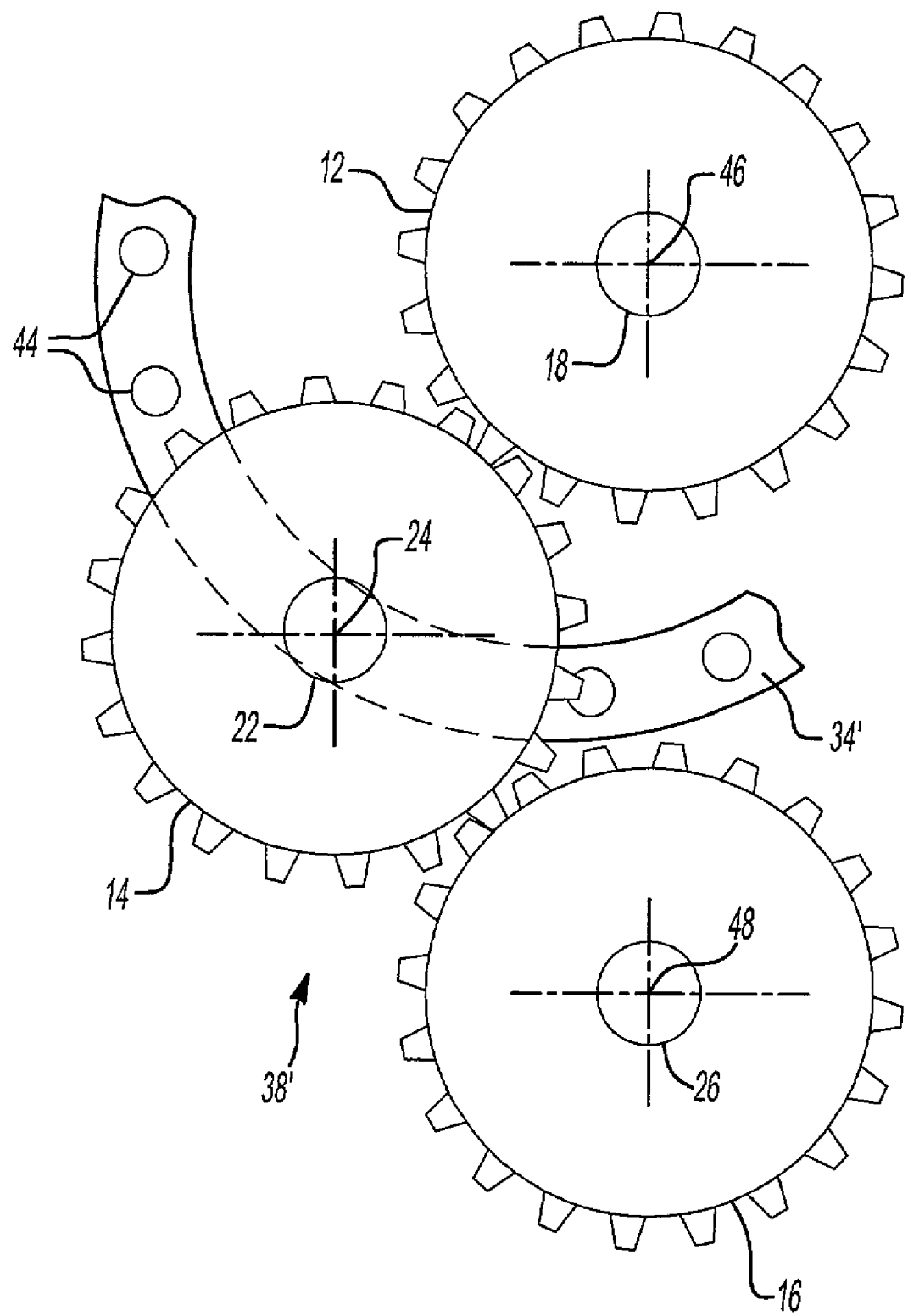
FIG. 5 is a schematic view of another transfer case assembly according to the present invention.

Referring to FIG. 5, the arcuate slot 34 is centered about the first axis 46. The output shaft 26 defines a third axis 48, parallel and offset from the first axis 46. In FIG. 5, each of the idler shaft predetermined mounting location 38' are equidistant to the to first axis 46 and vary in distance relative to a third axis 28. That is, the arcuate slot 34' defines a focus at the input shaft 18 as opposed to the output shaft 26. Each of the idler shaft predetermined mounting locations 38' preferably corresponds with an output gear 16 of a particular predetermined size. Each output gear 16 corresponds to the varying distance between the third axis 28 and the second axis 24. Each particular output gear 16 provides a particular new gear ratio.

The invention has been described in an illustrative manner, and it is to be understood that the terminology that has been used is intended to be in the nature of words of description rather than of limitation. Obviously, modification and variations of the present invention are possible in light of the above teachings. It is, therefore, to be understood that within the scope of the appended claim the invention may be practiced otherwise than as specifically described.

What is claimed is:

1. A transfer case assembly for a vehicle comprising:
   a transfer case housing defining multiple idler shaft predetermined mounting locations;
   a first gear mounted on a first shaft, said first gear mounted within said transfer case housing and rotatable about a first axis;
   a second gear mounted on a second shaft, said second gear mounted within said transfer case housing and rotatable about a second axis, said second axis spaced from said first axis; and
   an idler gear mounted on an idler shaft, said idler gear rotatable about a third axis, and engaging said first gear and said second gear, said idler shaft mounted at one of said multiple idler shaft predetermined mounting locations wherein one of said first shaft and said second shaft is connectable to drive at least one vehicle wheel, said first and second axes being fixed within said transfer case housing, and said idler shaft being movable relative to said first and second axes, to be mounted at said one of said multiple idler shaft predetermined mounting locations, to allow a selection of a desired gear ratio between said first and second gears.

2. The transfer case assembly as recited in claim 1, further comprising a carrier supporting said idler shaft.

3. The transfer case assembly as recited in claim 2, wherein a wall of said transfer case housing defines an arcuate slot to receive said carrier.

4. The transfer case assembly of claim 3, wherein said arcuate slot is a groove and said carrier has a tongue which is received in said groove.

5. The transfer case assembly as recited in claim 3, wherein said arcuate slot defines said multiple idler shaft predetermined mounting locations.

6. The transfer case assembly as recited in claim 2, further comprising a pin to mount said carrier at any of said multiple idler shaft predetermined mounting locations.

7. The transfer case assembly as recited in claim 6, wherein said pin is perpendicular to said carrier.

8. The transfer case assembly of claim 2, wherein said multiple idler shaft predetermined mounting locations are defined by equidistant locking positions for said carrier.

9. The transfer case assembly of claim 2, wherein said carrier is flush with a wall of said transfer case housing when said carrier is mounted to said transfer case housing.

10. The transfer case assembly as recited in claim 1, wherein said first gear is of a predetermined size, said predetermined size associated with one of said multiple idler shaft predetermined mounting locations.

11. The transfer case assembly as recited in claim 1, wherein each of said multiple idler shaft predetermined mounting locations is equidistant from said first axis.

12. The transfer case assembly of claim 11, wherein said multiple idler shaft predetermined mounting locations are defined along an arcuate slot, and said arcuate slot is centered about said first axis.

13. The transfer case assembly of claim 1, wherein said multiple idler shaft predetermined mounting locations are all equidistant from said first axis.

14. The transfer case assembly of claim 1, wherein said multiple idler shaft predetermined mounting locations are equidistant from said second axis.

15. The transfer case assembly of claim 1, wherein each of said multiple idler shaft predetermined mounting locations are equidistant from said first axis, and wherein said first axis is an input gear axis.

16. A method of assembling a transfer case comprising of the steps of:
   a) mounting a first gear of a first size on a first shaft;
   b) locating the first shaft at a first predetermined mounting location, the first shaft defining a first axis of rotation;
   c) mounting a second gear of a second size on a second shaft;
   d) locating the second shaft at a second predetermined mounting location, the second shaft defining a second axis of rotation;
   e) mounting an idler gear to an idler shaft; and
   f) positioning a carrier which mounts the idler shaft at one of a plurality of predetermined idler shaft mounting locations after said step b) such that the idler gear engages the first gear and the second gear, wherein one of the first shaft and the second shaft drive at least one vehicle wheel through associated transmission elements.

17. The method according to claim 16, wherein said step a) further comprises selecting the first gear from a plurality of gears, each of the plurality of gears having a predetermined size, and associating one of the plurality of predetermined idler shaft mounting locations with the predetermined size of a selected one of the plurality of gears.

18. The method according to claim 16, including:
   g) mounting the idler shaft to the carrier prior to said step f).

19. The method according to claim 16, wherein said step f) further comprises pinning the carrier within an arcuate slot at said one of the plurality of predetermined idler shaft mounting locations.

20. The method of claim 16, wherein the first axis of rotation and the second axis are in a fixed location.

21. A transfer case assembly for a vehicle comprising:
a transfer case housing; and
an idler shaft mounted to a carrier wherein said carrier is movable between a plurality of predetermined idler shaft mounting locations defined along an arcuate slot within said transfer case housing, said idler shaft transmitting rotation from a first gear to a second gear said first gear being associated with a first shaft and said second gear being associated with a second shaft, and at least one of said first and second gears for driving a vehicle wheel through associated transmission elements.

22. The transfer case assembly of claim 21, wherein said carrier is fixed in a position within said arcuate slot by a pin.

23. The transfer case assembly of claim 21, wherein said carrier is flush with a wall of said transfer case housing when said carrier is mounted to said transfer case housing.

* * * * *